United States Patent

[11] 3,524,421

[72] Inventors Alfred H. Schwendtner
 New York, New York;
 James F. Convery, New York, New York
[21] Appl. No. 689,451
[22] Filed Dec. 11, 1967
 Continuation-in-part of Ser. No. 526,904,
 filed Feb. 11, 1966, now Pat. No. 3,437,066
[45] Patented Aug. 18, 1970
[73] Assignee Lykes Enterprises, Inc.
 a Corp. of Louisiana by mesne assignments.

[54] BARGE HANDLING MEANS AND METHOD
 12 Claims, 22 Drawing Figs.
[52] U.S. Cl. .................................................. 114/43.5
[51] Int. Cl. ..................................................... B36b 35/44,
 B63b 27/16

[50] Field of Search........................................... 114/43.5,
 72; 214/12, 13, 15; 187/29

[56] References Cited
 UNITED STATES PATENTS
 2,988,036 6/1961 Mooneyhan et al. ......... 114/72
 3,318,276 5/1967 Nemec ......................... 114/43.5
 3,207,265 9/1965 Lund et al..................... 187/29

Primary Examiner— Trygve M. Blix
Attorney—J. T. Martin

ABSTRACT: Automatic system for engaging and positioning barges to be stowed aboard a marine carrier for ocean transport that includes a control panel together with electrical connectors from that panel to the hydraulic and mechanical means to engage and position the barges.

Patented Aug. 18, 1970

BARGE HANDLING MEANS AND METHOD

This application is a continuation-in-part of copending United States Application Serial No. 526,904 filed February 11, 1966 and now Patent No. 3,437,066.

A marine carrier designed to accept floating barges for storage aboard her for ocean transport has been disclosed in United States Application Serial No. 508,631, filed by Frank A. Nemec on October 22, 1965 from which United States Patent No. 3,318,276 issued on May 9, 1967. United States Application Serial No. 574,523 filed July 7, 1966, a division of United States Application Serial No. 508,631, claims an elevator system aboard such a marine carrier. Copending United States Application Serial No. 526,904 discloses an improved system of engaging and positioning the barges aboard the carrier by certain hydraulic and mechanical means, preferably a plurality of dollies capable of lifting the barge, positioning it for storage, and lowering it into storage position.

An object of this invention is to afford a more economical and efficient system for using the improved hydraulic and mechanical means described in United States Application Serial No. 526,904.

Specifically, a further object of this invention is to automate the engaging and positioning of barges aboard such a marine carrier.

A system has been developed that is capable of automatically engaging and positioning barges aboard such a marine carrier. The system includes a control panel designed to direct the sequence of functions of many of the elements necessary to the system by means of electrical leads and connections.

This control panel utilizes electricity produced by generators in motors used to tow the transporter fore and aft. The control panel can be used to direct the various functions necessary to assure automatic sequencing of lifting the barge from its position on the barge platform elevator, transporting the lifted barge from its position on the elevator to a storage position on the storage deck, and lowering the barge into its stored position on the selected barge storage deck.

The functions of lifting and lowering the barge can be performed by hydraulic or other suitable means capable of assuring clearance over both the elevator and storage deck while being transported from one to the other, and is preferably performed by a transporter of the type described herein.

Such a transporter can be used to perform the functions of lifting the barge, transporting the barge from the elevator onto the storage deck, and lowering the barge into a position of stowage on that selected deck.

Such a transporter can carry its own means that will be used to lift and lower the relatively large weight of a barge. Hence, the means for lifting and lowering the barge and the means used to support that lifting means should be of sturdy construction to function safely during turbulent sea conditions. The transporter consists of two dolly trains interconnected at the forward end by a mule and at the aft end by a power package vehicle. This transporter unit is used to lift a barge, transport it to another location while raised, and lower it onto other support means.

The automatic control of many functions of the system is accomplished by a series of limit switches, timer switches, and other control switches to be described in detail.

For a clearer understanding of this control system, reference is made to the attached drawings.

FIGURE 12AA represents a cross-section view of the geared limit switch mechanism taken at line A-A of FIGURE 12A.

FIGURE 12BB represents a side view of the tension tape used to actuate the geared limit switches of FIGURE 12A so as to reflect accurately the position of the elevator.

Referring now to these drawings, I shall describe my invention with greater particularity. In this embodiment of the invention, two stern gates 5 and 5A are employed to assure a watertight seal of the lowest barge storage deck of the marine carrier. During the period of transportation at sea, gates 5 and 5A are tightly closed. When the carrier arrives in port for unloading, these gates must be opened to allow the barges stowed on the lowest deck to be returned to their free-floating attitude.

Both gates 5 and 5A rest on rollers 50 while closed, and are held securely against hull struts 51 by hydraulic dogs 52. A strip 53 is welded or otherwise fastened to gate 5A along all four edges to insure a continuous pressure seal when the dogs are tightened.

To open gate 5A, dogs 52 are hydraulically opened releasing the pressure along strip 53. The seal is then broken by hydraulic cylinders 54 and 55 and the gate is rolled aft by these cylinders to a point where the channel sections embracing rollers 56 are vertically aligned with channels 57 and 58. Stern gate 5A can then be raised by cylinder 6 to a position above the loading opening for storage deck 9. By providing dual channel sections 59, stern gate 5 can be raised or lowered when gate 5A is either in an open or closed position. Similarly, gate 5A can either be raised or lowered while gate 5 is in either an open or closed position.

Figure 2:
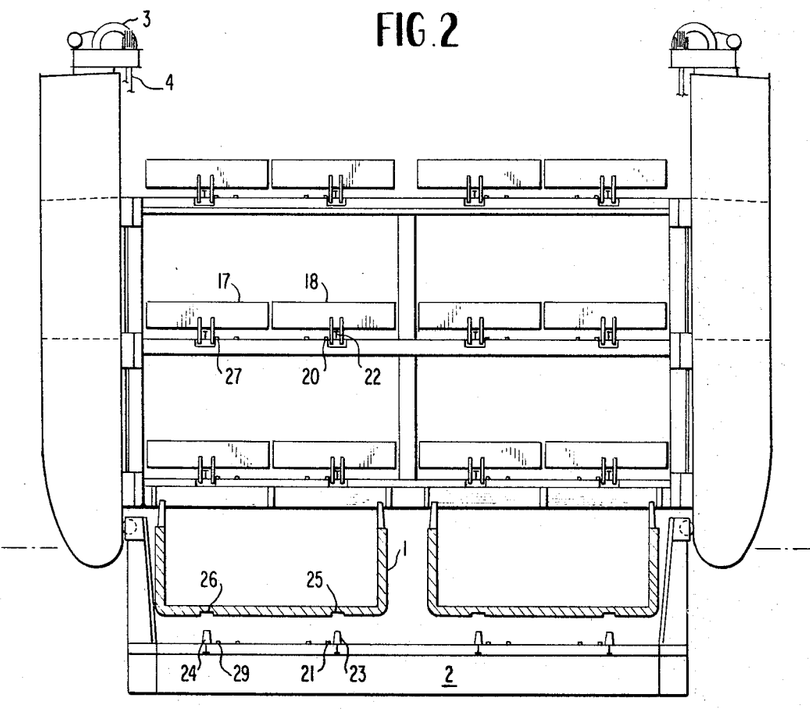
FIGURE 2 represents a vertical cross-section taken perpendicular to the centerline along line 2-2 of FIGURE 1.

In FIGURE 2 a barge 1 is shown floating over a barge loading elevator platform 2 which is connected to a series of winches 3 by cables 4. When the barge 1 is in place over the platform 2, the winches 3 are energized in unison to lift the platform 2 by means of cables 4 into engagement with the barge 1. The stern gates 5 and 5A can be lowered to their closed positions by hydraulic cylinders 6 attached to the hull of carrier 8, affording free access to storage deck 10.

The barge 1 is then lifted by barge lifting platform 2 to a level substantially in a plane with one of the storage decks of the ocean-going barge carrier 8. This could be one of the three deck levels shown in FIGURE 1 and represented by the numbers 9, 10 and 11.

Figure 1:
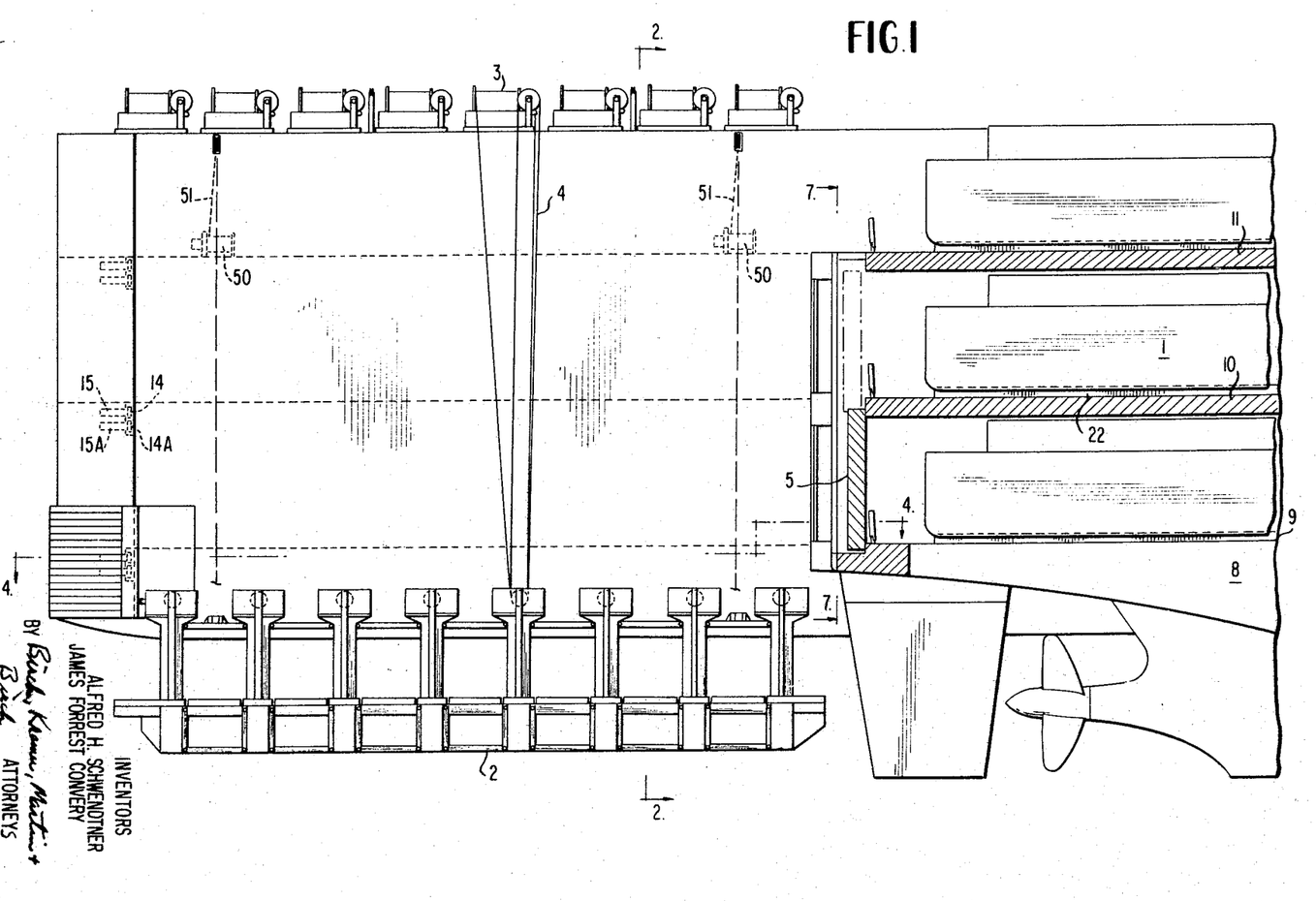
FIGURE 1 represents a vertical cross-section taken along the centerline of the stern portion of a marine carrier of the type described in U. S. Patent No. 3,318,276 modified to accommodate a dolly system substituted for the roller system described in that patent.

For example, in FIGURE 1 the platform 2 has raised the barge 1 by means of winches 3 and cables 4 to the barge storage deck level 10. Each of the barge storage deck levels 9, 10 and 11 are equipped with transporter units 7 including dual trains of connected barge handling dollies. Such a train is numbered 12 in FIGURE 3. This unit may be moved along the storage deck level out onto the barge lifting platform 2 on tracks to be described later when the barge lifting platform and the barge storage deck are co-planar.

Figure 3:
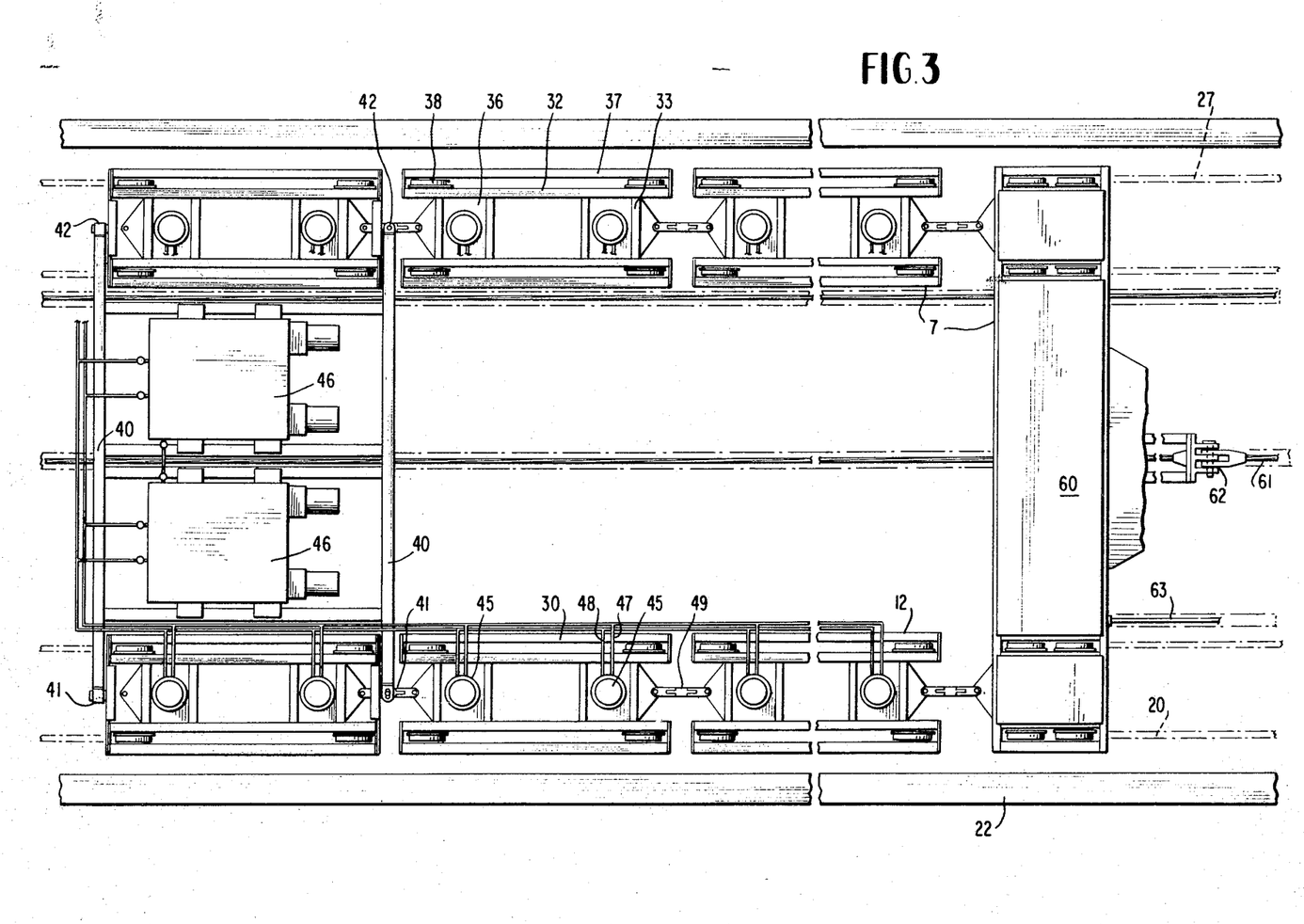
FIGURE 3 represents an overhead view of a portion of a transporter unit on its support rails.

FIGURE 3 represents the overhead view of deck 10 to which symmetrical sets of dolly rails and support rails are fastened for support of the dollies and barges. One such dolly rail 20 supports one side of the dolly train 12 and runs approximately the entire length of the storage deck level. When the barge lifting platform 2 is raised by winches 3 to the level of the barge storage deck 10, the rail 20 coincides with rail extension 21 on the barge lifting platform 2. In similar fashion, all the dolly rails and support rails used on each of the barge storage decks are aligned with their respective platform extensions. Support rail 22, for example, which may be used to support barge 1 for storage is complemented by a parallel support rail to accommodate the other side of barge 1. And, as in the case of the dolly rails and other support rails, once the barge lifting platform 2 is lifted to the level of the storage deck 10, the support rail 22 coincides with support rail extension 23 on the platform.

Each individual dolly 30 is of strong construction, preferably in a rectangular shape having its frame members fastened together at right angles as shown in FIGURE 3. Longitudinal members 31 and 32 are fastened to transverse members 33 and 34 at a distance apart sufficient to allow cylinder platforms 35 and 36 to be fastened, one fore and one aft, in the space remaining between them. Similarly longitudinal pieces 37 and 38 are fastened to longitudinal pieces 32 and 31, respectively, so that wheels 38 and 39 can be fastened, respectively, in the space remaining between them.

The dolly trains are connected at their aft dollies by connecting rods 40 flexibly connected to the port and starboard dolly trains at couplings 42 and 41, respectively. Longitudinal rods 43 connected to connecting rods 40 form dual seats for cross-connected, self-contained hydraulic power packages 46.

Fastened to each dolly are two hydraulic cylinders 45 shown in FIGURE 3 each enclosing a piston. The cylinder 45 may be dual acting so that the piston may be both raised and lowered by hydraulic pressure. This hydraulic fluid may be admitted through line 47 and permitted to exit through line 48 or vice versa as the movement of the piston reverses. Such a hydraulic system can be self-contained in the transporter unit by the use of electrically-operated, hydraulic power packs 46, the motors of which are supplied electric power through retractable cable 63.

The support rail 22 shown in FIGURE 3 runs substantially parallel to the tracks upon which the dolly wheels rest. The dollies are attached in tandem by a flexible coupling 49 shown in FIGURE 5. Such a coupling will allow very little increase or decrease in the distance between adjacent dollies. Thus, a train of many dollies does not substantially increase or decrease in length in its movements fore and aft on the tracks. The wheels of the dollies may be of any construction sufficient to take the stress involved, an ordinary roller bearing wheel being sufficient.

Two trains of dollies may be fastened together in tandem by rigid mule 60 shown in FIGURE 3. The member then can be fastened to a central cable or the like 61 which can be used to pull the mule 60 fore and aft across the barge storage deck to the extremes of the cable length defined by a pulley or the like at each of the fore and aft extremes of the storage deck level. A winch located at the forward end of storage deck 10 tows cable 61 fore and aft. Arranging the mule at the forward end of the tandem trains of dollies allows the mule to be towed to its extreme position aft causing the tandem trains of dollies to extend out onto the barge lifting platforms underneath a barge supported on support rail extension 23 and its parallel counterpart support rail extension.

Figure 12:
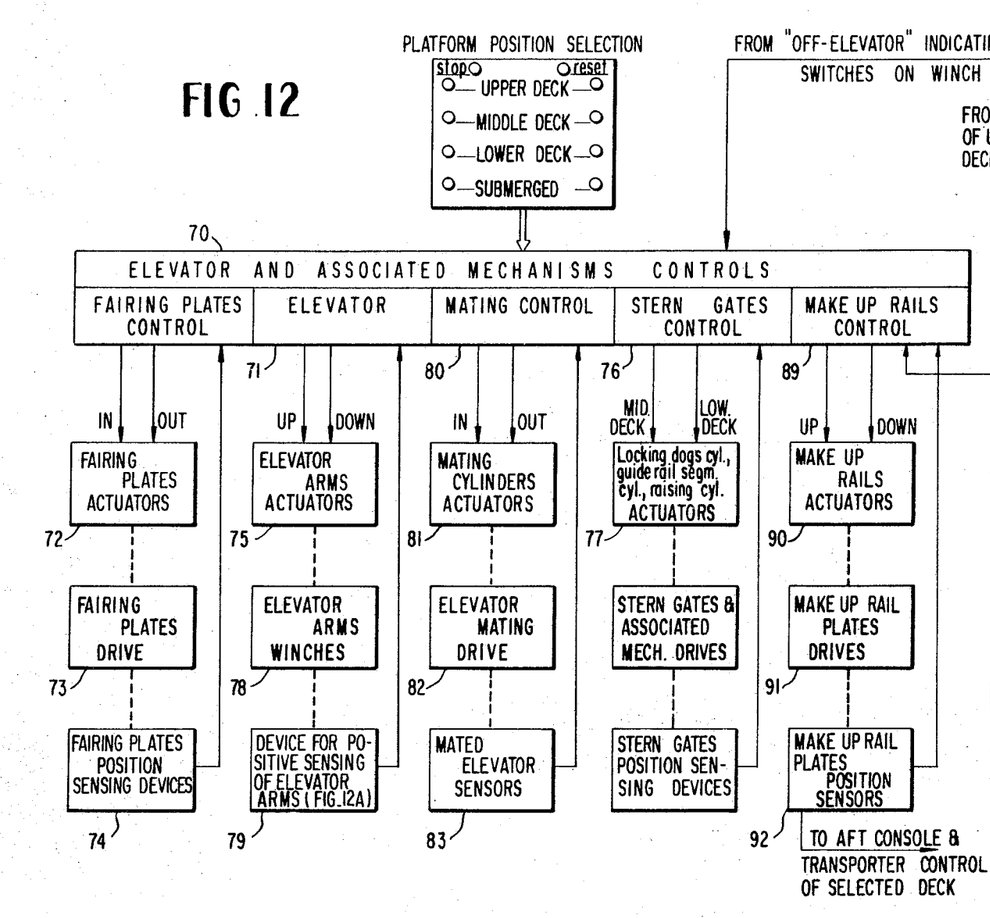
FIGURE 12 represents an electrical diagram of the main control circuits of the elevator control system.
Figures 12, 12A:
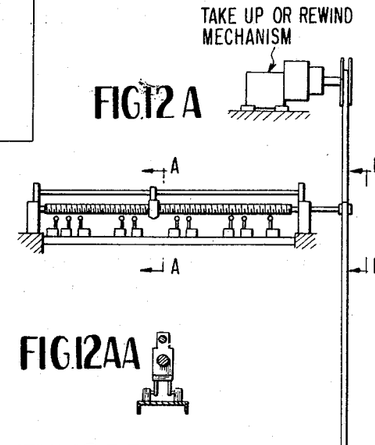
FIGURE 12A represents a view of a series of geared limit switches showing the means by which they are actuated as the elevator is raised or lowered.

In the specific embodiment shown in FIGURES 1 12, barge 1 is floated over barge lifting platform 2. Constant tension winches are attached to the barge while it is in a free-floating attitude to aid in positioning the barge over support rail extensions 23 and 24.

When barge 1 is in position over rail extensions 23 and 24, barge lifting elevator platform 2 is raised by cables 4 wound on winches 3. In this instance, barge 1 is engaged by lifting support rail extensions 23 and 24 into slots 25 and 26, respectively.

Figure 4:
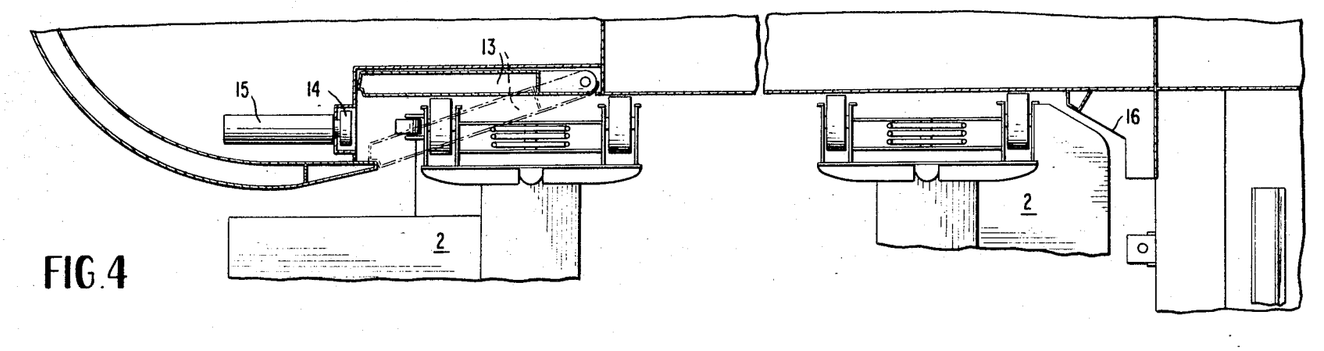
FIGURE 4 represents a horizontal cross-section of the port stern wing of the marine carrier and port side of the elevator taken at lines 4-4 of FIGURE 1.
Figure 4A:
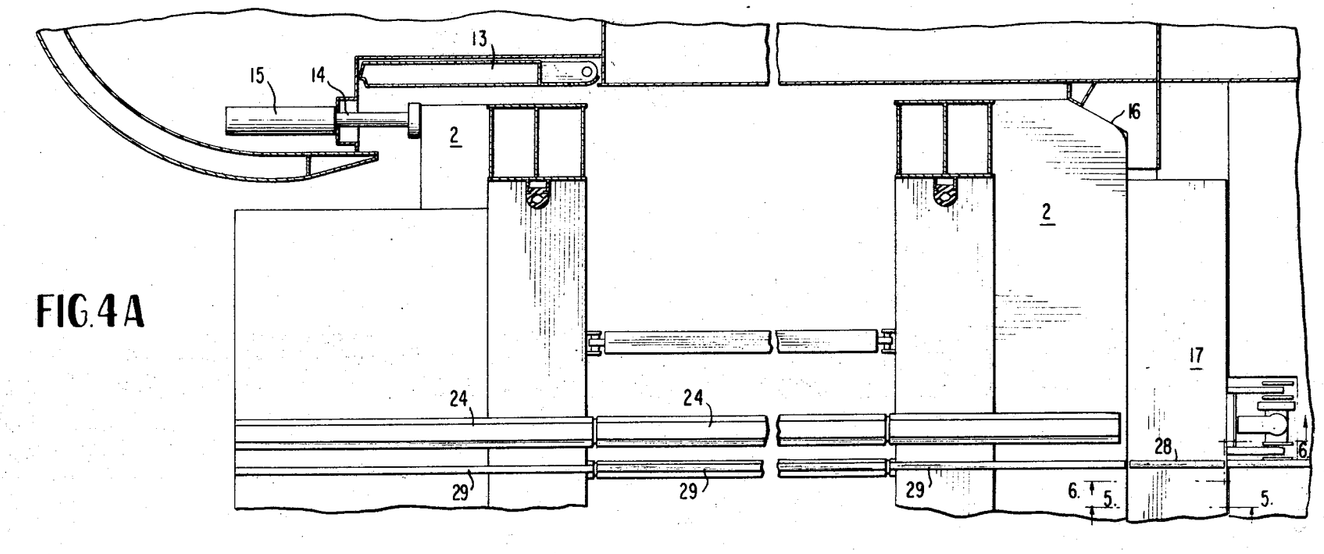
FIGURE 4A represents a horizontal cross-section of the port stern wing of the marine carrier and port side of the marine carrier and port side of the elevator taken at lines 4-4 of FIGURE 1 after the elevator has been raised to the level of the lowest storage deck.

Prior to lifting the elevator from submergence, fairing plate 13 and its corresponding starboard fairing plate must be opened from a closed position shown in FIGURE 4 to an open position shown in FIGURE 4A.

Once these fairing plates are opened, affording unobstructed vertical movement for platform 2, the elevator can lift barge 1 to any selected storage deck level, as, in this instance, storage deck 10. When platform 2 is raised to a level co-planar with storage deck 10, piston 14 of port hydraulic cylinder 15 engages elevator platform 2 and pushes it forward into mating engagement with seat 16 securing platform 2 from fore and aft and lateral movement. Port cylinder 15 is aided by port cylinder 15A immediately underneath it, and a set of corresponding starboard cylinders not shown. Four such cylinders are similarly positioned on each of the storage deck levels.

Figure 5:
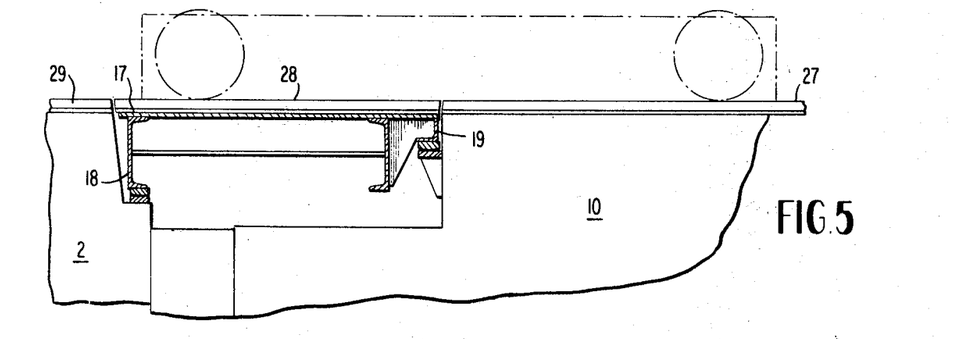
FIGURE 5 represents a vertical cross-section of the make-up rail mechanism taken at lines 5-5 of FIGURE 4A.
Figure 6:
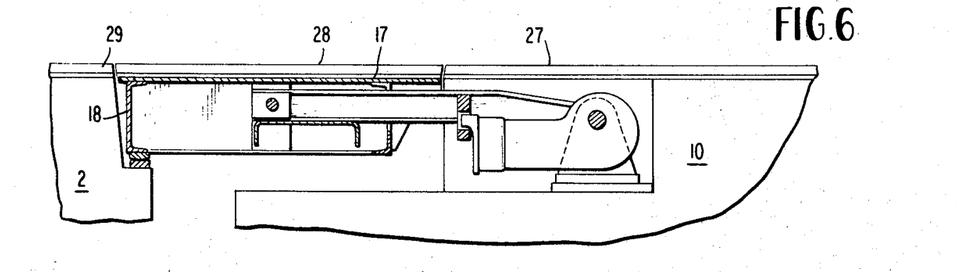
FIGURE 6 represents a vertical cross-section of the make-up rail mechanism taken at lines 6-6 of FIGURE 4A.
Figures 7, 8, 9, 10, 11:
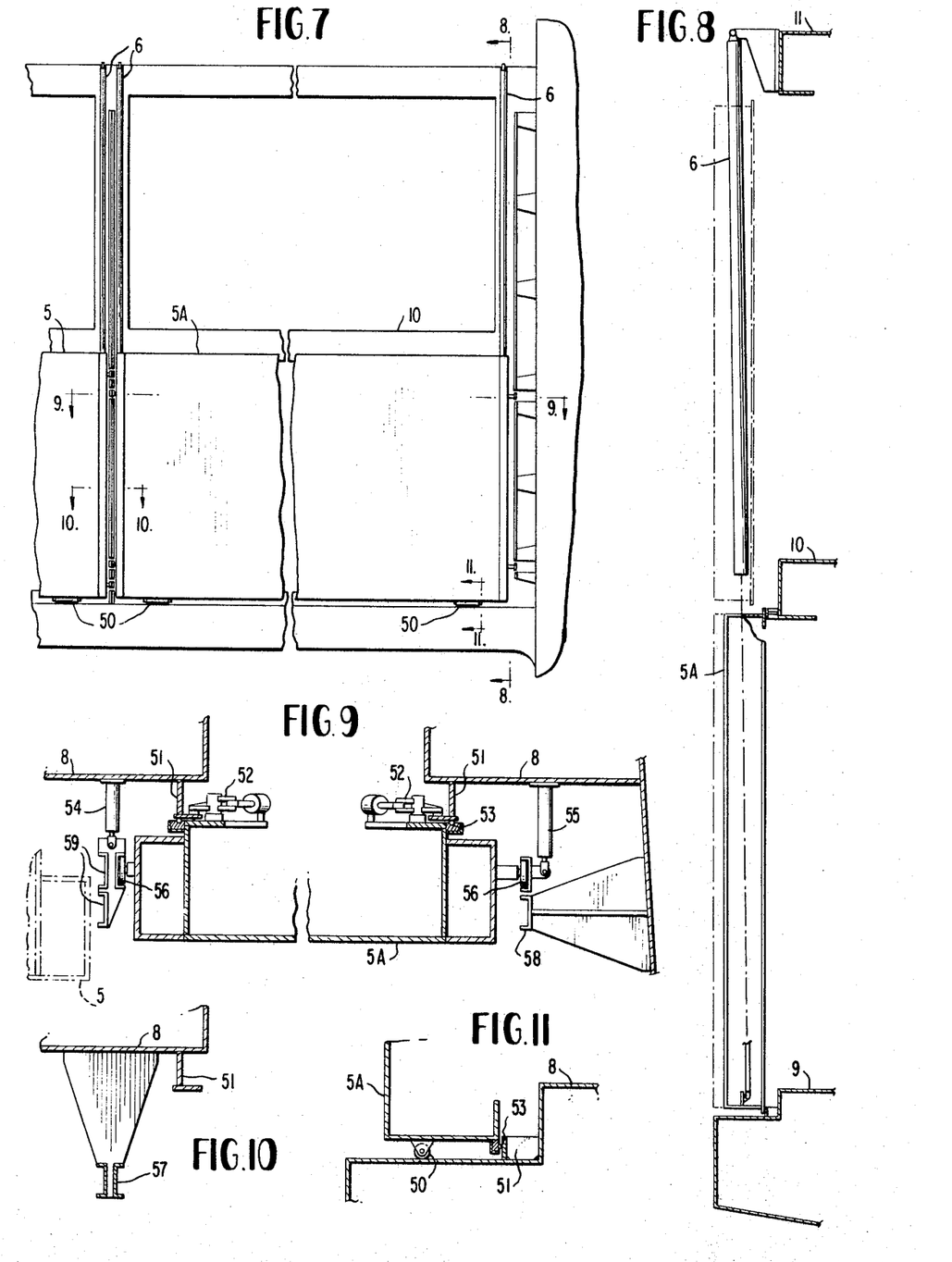
FIGURE 7 represents a vertical cross-section of the stern of the marine carrier taken perpendicular to the center-line of the marine carrier along the lines 7-7 of FIGURE 1.
FIGURE 8 represents a vertical cross-section of the stern gate taken in a plane parallel to the centerline along the lines 8-8 of FIGURE 7.
FIGURE 9 represents a horizontal cross-section of the stern gate taken in a plane parallel to the centerline along the lines 9-9 of FIGURE 7.
FIGURE 10 represents a horizontal cross-section of the stern gate channels taken along the lines 10-10 of FIGURE 7.
FIGURE 11 represents a vertical cross-section of the stern gate taken along lines 11-11 of FIGURE 7.

After platform 2 is secured into position, make-up plates 17 and 18 are lowered into position co-planar with storage deck 10. A detailed construction of plate 17 is shown in FIGURES 5 and 6 indicating strong, rigid support channels 18 and 19 resting on platform 2 and storage deck 10, respectively. Make-up rail 28 is thereby aligned with storage deck dolly rail 27 and elevator platform dolly rail extension 29. Thus, the dolly rails are aligned and continuous from the elevator platform onto the storage deck.

The transporter unit 7 is towed over these make-up rails out onto the elevator platform by cable 61 connected to mule 60. When the connecting coupling 62 is at its most extreme position aft, transporter unit 7 is entirely on the platform 2 and underneath barge 1.

Power packs 46 are energized and hydraulic fluid is pumped through lines 47 and 48 lifting pistons 45. Pistons 45 engage the bottom of barge 1 at substantially the same time varying with the unevenness of the bottom of the barge and the platform. As the pumping continues, barge 1 is lifted out of engagement with the elevator support rails 23 and 24 so that its weight is assumed by pistons 45.

After the barge is lifted to a predetermined height above the support rails, the pumping rate is reduced and the barge is towed forward by cable 61 over the make-up rails and onto the storage deck. During this travel, barge 1 is frictionally secure on the upper surface of pistons 45. The barge is towed in this manner until it is positioned for storage at the desired location above the storage deck support rails.

When the desired storage position has been attained, the hydraulic pumps in power packs 46 are reversed so that their hydraulic fluid flows in reverse direction and pistons 45 simultaneously are lowered. This lowers the barge onto the two parallel support rails provided for its support. The pumps are then de-energized and the transporter unit is free to be towed aft and out onto the barge lifting platform to receive another barge for storage.

When loading is complete, the barge loading platform can be raised to its highest deck level position and secured there, with or without barges still stored in it. The gates 5 and 5A for the lower deck barge storage level can then be lowered by cylinders 6 to its closed position to ready the carrier for its sea voyage. Port fairing plate 13 and its corresponding starboard fairing plate are closed to aid in streamlining the hull of the vessel to reduce drag while at sea. Upon arriving at its destination, this process would be reversed until all the barges were off-loaded. The cycle would then be ready to be recommenced.

Each of the above described steps can be performed sequentially either by manually controlling each step or through automatic controls. Such automatic controls can position the stern gate according to a preselected plan of utilization of the storage decks, raise the elevator from submergence to a preselected storage deck level, move the elevator forward into mating position with the selected storage deck, lower the make-up rails into alignment co-planar with the elevator and storage deck level, tow the transporter out onto the elevator, lift the barge, tow the barge to its storage point, lower the barge into stowed position, and return the transporter to its starting position at the aft end of the storage deck while submerging the elevator to engage another barge.

Both the sequence and the speeds of these steps can be modified as desired. Automatic controls can be pre-set to vary the speeds of the transporter unit according to whether the unit is towing a barge, nearing the storage position preselected for the barge, or returning to receive another barge. Such a control system can include limit switches, timer switches, and memory devices used to automatically signal changes in speed for the transporter.

A complementary set of alternate electrical controls can be provided for manual control of each step as desired. And, an emergency stop braking system can be provided as a safety feature ancillary to the automatic controls.

FIGURE 12 shows the elevator control panel 70 receiving electrical energy from a generator source and controlling its distribution. On arrival at the port to be used for on-loading barges, the barge elevator platform is unlocked from its secured at-sea position manually by releasing the retaining means such as tightened toggles or the like.

The elevator control panel indicates by means of lights that the elevator has been released and that power is available for repositioning the elevator. The fairing plates 13 must be opened to their respective positions in a plane substantially parallel with the centerline of the vessel such as that shown in FIGURE 4A to unlock the elevator drive 71. This is accomplished by electrically engaging the fairing plate actuators 72 that drive the fairing plates by hydraulic or similar means 73 to their opened positions where they electrically engage sensors 74 that electrically unlock the elevator drive 71.

A signal notifies the elevator control operator that the elevator drive is unlocked, and the operator lowers the elevator by elevator winches 78 to its submerged position preparatory to receiving barges thereon. One or two barges such as barge 1 are floated over the elevator and positioned by a constant tension device comprised of constant tension winch 50, tension lines 51, and means for fastening lines to the floating barge. Upon selecting a deck such as deck 10 for initial loading, the elevator control operator engages an electrical elevator drive actuator 75 that raises elevator 2 to the level of deck 10. This actuator 75 also signals the stern gate control 76 that deck 10 has been selected. Stern gate actuator 77 is not required to open and raise the stern gates since these gates are already in their lowered positions. This information is relayed to the elevator control panel by means of electrical sensors.

Upon the arrival of elevator 2 at deck 10 in an attitude substantially co-planar with that storage deck level, sensors 79 relay an electrical signal to the elevator control panel 70 that indicates that elevator 2 is co-planar with deck 10 and unlocks and actuates the mating control 80 for deck 10.

Mating control actuator 81 drives port mating pistons 14 and 14A and their corresponding starboard mating pistons forward into engagement with elevator 2 and further forward until elevator 2 is mated into its port seat 16 and its corresponding starboard seat. Sensors 83 signal the completion of mating to the elevator control panel but do not deenergize the mating drive 82. Constant drive pressure from mating drive 82 keeps elevator 2 mated and overcomes any minor hydraulic leakage in the mating drive system.

Sensors 83 also electrically unlock and actuate the make-up rail control 89 for deck 10. Make-up rail actuators 90 actuate make-up rail plate drive 91 which lowers the port make-up rail plates 17 and 18 and their corresponding starboard make-up rail plates.

When the make-up rail plates are lowered into position substantially co-planar with the level of deck 10 and the dolly rails thereon are aligned, sensors 92 signal the elevator control panel that the make-up rails are in position. These sensors 92 also unlock the transporter transfer control 100 for automatic control over port transporter unit 7 and its corresponding starboard transporter unit. Simultaneously, these sensors 92 unlock the aft operators console 101 that is used to direct the automatic sequencing of transporter transfer control 100.

Figures 14, 15:
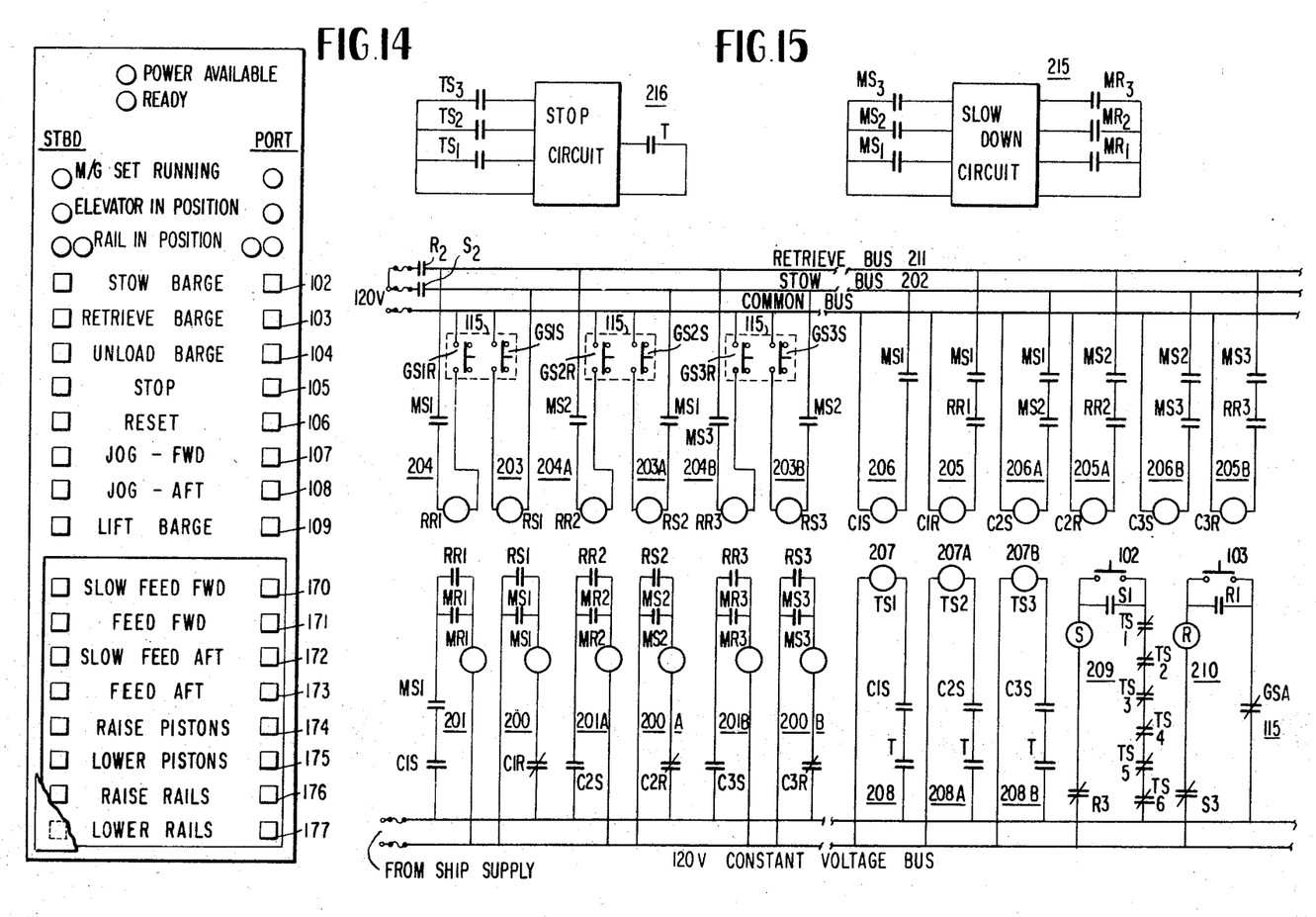
FIGURE 14 represents an aft operator's console as it is to be used on one of the barge storage decks to control the functions of the transporter.
FIGURE 15 represents an electrical diagram of the stowed barge position memory.

FIGURE 14 shows the aft operator's console 101 depicted as having two separate compartments one physically contained within the other and separated from the enclosing compartment by some secure means. The controls housed in this inner compartment will be described in detail later. The controls housed in the enclosing compartment consist of adequate signal indicators such as lights, maintained contact switches for automatic sequence selection, and momentary contact switches for manual sequences selection.

Maintained contact switch 102 starts the automatic sequence of stowing a barge on deck 10. Maintained contact switch 103 starts the automatic sequence of retrieving a barge from its stowed position to a position just forward of the elevator 2. Maintained contact switch 104 starts the automatic sequence of unloading a barge from a position just forward of elevator 2 to a position on elevator 2.

Momentary contact switch 105 can be used to stop the barge at any desired time. Momentary contact switch 106 must be used after use of switch 105 to reset the availability of both manual and automatic controls. Momentary contact switch 107 can be used to move the transporter unit 7 forward at the slow feed speed while depressed. Momentary contact switch 108 can be used to move the transporter unit 7 aft at the slow feed speed while depressed. Momentary contact switch 109 is used to raise the pistons 45 on transporter 7 to a position where sensors actuate automatic sequencing to be described later. A set of these momentary contact switches 105-109 is provided at each position on deck 10 where a barge can be stowed. Only one aft operator's console is required for each deck, and switches 105-109 that console control the aft port position for barge stowage on deck 10 while the starboard switches corresponding to 105-109 are also contained in console 101 as shown and control the aft starboard position for barge stowage on deck 10.

Figure 13:
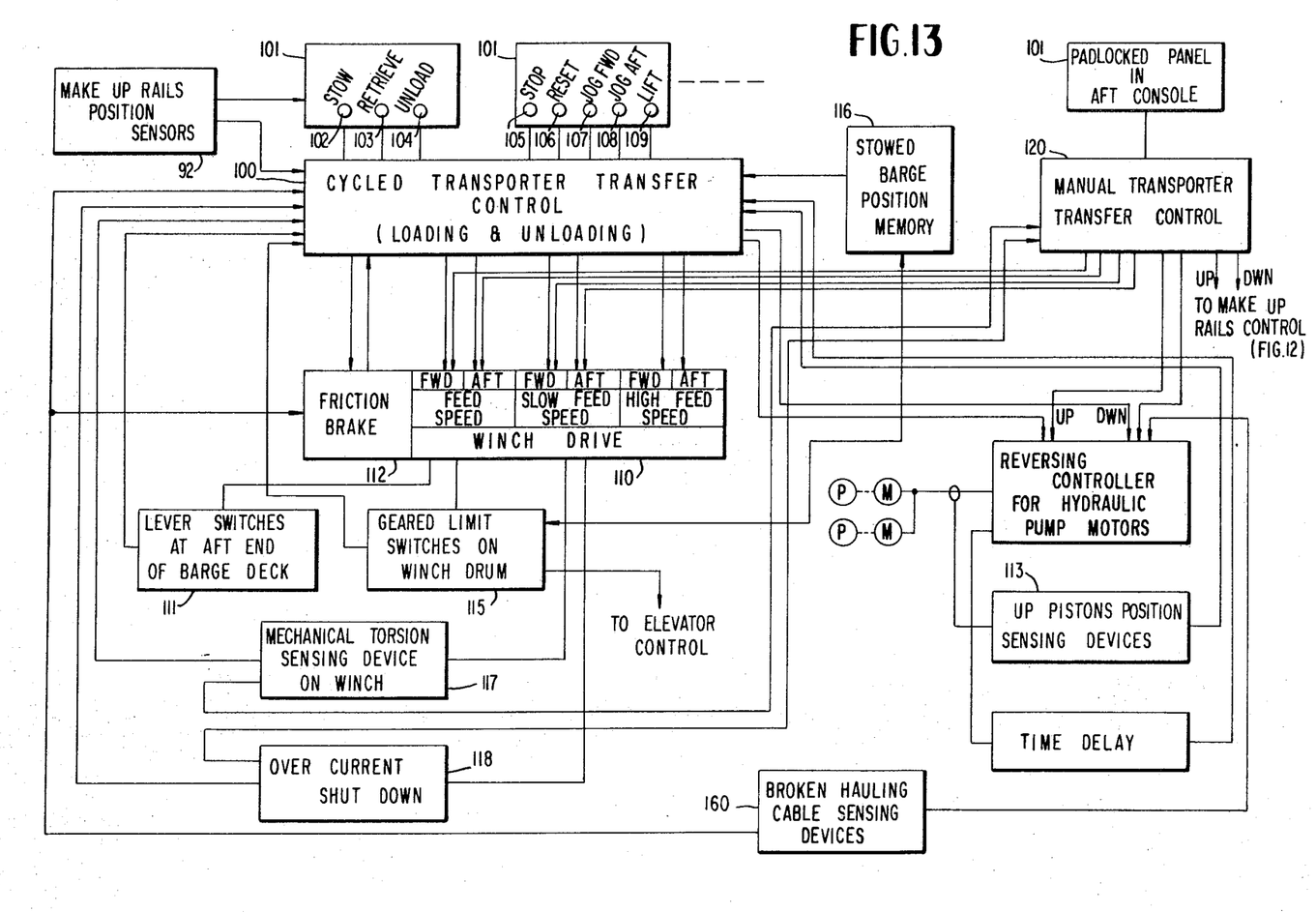
FIGURE 13 represents an electrical diagram of the main control circuits of the transporter transfer system.

FIGURE 13 is a diagrammatic illustration of the function necessary to the automatic sequencing of barge loading and and unloading from elevator 2 to deck 10 and back onto elevator 2. After the transporter transfer control 100 and after operator's console 101 have been unlocked by the make-up rail sensors and the transporter has been manually driven by jog aft switch 108 or the like to its automatic sequence starting position just forward of elevator 2 on deck 10, stow barge switch 102 is depressed to start the automatic barge stowage cycle.

Depression of switch 102 signals transporter transfer control 100 to start the winch drive 110 at feed speed towing transporter 7 aft onto elevator 2 by cable 61. Mule 60 is provided with a cam or other means to engage a lever limit switch 111 fastened to deck 10 at a distance forward of the elevator sufficient to insure stopping the transporter 7 on elevator 2.

Tripping switch 111 signals control 100 to cut the power to winch drive 110 and set winch drive brake 112. Setting brake 112 signals control 100 to start the hydraulic pumps in transporter power packs 46 to raise pistons 45. An ordinary current sensing device 113 can gauge by its proximity to transporter power cable 63 when the pistons 45 have reached the fully raised position, and signal control 100 to that effect. This signal from sensing device 113 causes control 100 to start winch drive 110 at the slow feed speed and begin towing cable 63 and transporter 7 forward.

As the aft dolly of transporter 7 leaves the elevator, a geared limit switch 115 on winch drive 110 signals control 100 and the power supplied winch drive 110 is increased until feed speed is reached. Winch drive 110 will continue at that speed until the geared limit switch for the forwardmost unoccupied barge stowage position is actuated. The stowed barge position memory 116 described later designates which of these geared limit switches need be so actuated to signal control 100 to regeneratively brake from feed speed to slow feed speed. The indentity of the required geared limit switch is recorded in stowed barge position memory 116 for the following stowage cycle.

While being towed forward at a slow feed speed, transporter 7 next abuts either the aftermost stowed barge on the same side of deck 10 or the bulkhead at the forward end of storage deck 10. In either case, this abutting puts added tension on cable 61 which actuates mechanical torsion sensing device 117 by means to be described later. Torsion sensing device 117 signals control 100 to cut the power to winch drive 110 and set brake 112. Torsion sensing device 117 also cuts off drive power that otherwise would be available to manual by-pass control 120 to be described later. In addition to torsion sensing device 117, such added tension would cause winch drive 110 to draw an overload of power which would trip an overcurrent shutdown 118 cutting off power to both control 100 and manual by-pass control 120. Setting brake 112 signals control 100 to start the hydraulic pumps in power packs 46 to lower pistons 45. After a time delay sufficient to assure that pistons 45 have been completely lowered, control 100 starts winch drive 110 at the high feed speed to tow the unloaded transporter 7 aft. Geared limit switch 115 signals control 100 to cut the power to winch drive 110 and set the brake 112 positioning transporter 7 just forward of elevator 2, its starting position at the commencement of the storage cycle.

Similarly, make-up rail sensors 92 permit the operation of both control 100 and the aft operators console 101 to accomplish the automatic barge unloading cycle. To unload barge 1, the transporter 7 is towed by winch drive 110 actuated by switch 108 or one of its corresponding local switches to the same position it occupied at the end of the barge load cycle, just forward of elevator 2. Retrieve barge switch 103 is depressed to start the cycle. Depressing switch 103 signals control 100 to power winch drive 110 at the high feed speed towing the transporter 7 forward. Stowed barge position memory 116 informs the geared limit switches 115 of the location of the aftermost stowed barge, and actuation of that limit switch on winch drive 110 signals control 100 to slow transporter 7 to the slow feed speed by regenerative braking.

During the retrieve phase of the unloading cycle, a second operator is assigned to barge deck 10 to operate the local controls at each barge stowage position. While transporter 7 is being towed forward at the slow feed speed, this second operator presses the local stop button corresponding to stop button 105 that is mounted near the aftermost stowed barge when transporter 7 is approximately centered underneath that aftermost stowed barge. This stops the power to winch drive 110 and sets brake 112. After each depression of any stop switch, a reset switch must be depressed to unlock control 100 and enable further manual and automatic actuation.

Local jog forward or local jog aft switches on that local control corresponding to switches 107 and 108, respectively, in console 101 are available for more accurate centering of transporter 7 underneath the barge. Either of these switches may be depressed to release brake 112 and tow transporter 7 in the desired direction at the slow feed speed until released, thereby cutting the power to winch drive 110 and setting brake 112.

After transporter 7 is satisfactorily centered underneath the barge, the local operator depresses the local lift barge switch corresponding to lift barge switch 109. This actuates the hydraulic pumps in power packs 46 raising pistons 45 into engagement with the bottom of the stowed barge, lifting the barge up off its support rails. Piston position sensing devices 113 signal control 100 that the pistons are raised, and control 100 powers winch drive 110 at the feed speed towing transporter 7 aft. Geared limit switch 115 signals control 100 as transporter 7 nears the elevator, cutting the power to winch drive 110 and setting brake 112 so as to return transporter 7 to its starting position just forward of elevator 2. Interrupting the automatic sequencing of the unloading cycle at this point is in the interest of safety, and would not necessarily be required.

After the aft operator on deck 10 is satisfied that all is in readiness for towing the loaded transporter out onto the elevator, the operator depresses unload barge switch 104 to continue the automatic sequencing of the unload cycle. Depressing switch 104 signals control 100 to power winch drive 110 at the slow feed speed to tow transporter 7 aft onto elevator 2. As mule 60 approaches elevator 2, a cam on mule 60 trips lever limit switch 111 located just forward of the elevator. Lever limit switch 111 signals control 100 to cut the power to winch drive 110 and set brake 112, stopping transporter 7 on elevator 2. Should lever limit switch 111 fail to properly cut the power to winch drive 110 and set brake 112, a mechanical torsion sensing device 120 could be actuated by mule 60 that would signal control 100 to cut the power to winch drive 110 and set brake 112. Should both the lever limit switch 111 and the torsion sensing device 117 fail, an electrical overcurrent shut down 118 is provided to perform the same functions.

Setting brake 112 signals control 100 to start the hydraulic pumps in power packs 46 to lower pistons 45. After a time delay sufficient to assure that pistons 45 have been completely lowered, control 100 powers winch drive 110 at the slow feed speed to tow transporter 7 forward off elevator 2. Geared limit switch 115 signals control 100 when transporter 7 leaves elevator 2, and control 100 cuts the power to winch drive 110 and sets brake 112. The transporter 7 has thus been returned to its original position prior to starting the unloading cycle, just forward of elevator 2, and is ready for the next unloading cycle.

Stowed barge position memory 116 is shown in detail by FIGURE 15. Each barge stowage position is represented in memory 116 by two memory control circuits, one for stowing action numbered 200, and the other for retrieving action number 201. Each of these two memory circuits for each barge position include an ordinary magnetic coil, a movable armature connected to at least one relay and circuit interruption relays. Additionally, each of the memory relays will be provided with a mechanical means to move the armature to manually restore the barge position information to the memory 116 after an inadvertent loss of power. To provide for retention of information in the memory when the transporter winch drive 110 is deenergized, as when the ship is at sea, the power supply to the memory relays will be taken from the vessel's 120 volt constant voltage bus or from any similar source expected to be maintained at all times.

Circuit 200 in FIGURE 15 comprises a coil represented by the designation MS1 enclosed in a circle, two open relays designated RS1 and MS1, respectively, and a closed relay designated CIR.

The memory 116 accumulates information in the following sequence assuming the port side of deck 10 is clear and barges are being supplied for stowage on that side in regular sequence. The operator depresses switch 102. This energizes coil S in circuit 209 from the constant voltage bus. Coil S closes contact $S_1$ by-passing switch 102 and locking circuit 209 closed. Coil S also closes contact $S_2$ which energizes stow bus 202. None of the geared limit switches 115 for barge positions aft of position 1 is operative since there is a memory relay contact that remains open in each circuit controlled by these limit switches. Only the control circuit 203 containing coil RS1, the stow relay coil for barge position number one, will have its coil energized by operation of its associated geared limit switch 115. When coil RS1 in control circuit 203 is energized by momentary actuation of its geared limit switch, GS1S, relay RS1 in memory control circuit 200 is closed by the motion of the armature of coil RS1. This energizes coil MS1 in circuit 200 which closes all MS1 relays, including the one in circuit 200, locking circuit 200 closed before GS1S is opened, which deenergizes coil RS1 and opens relay RS1 in circuit 200.

The closing of relay MS1 in circuit 203A, the circuit corresponding to barge position number two, allows coil RS2 to be energized when the geared limit switch in circuit 203, GS2S, is momentarily closed. Energizing coil RS2 closes relay RS2, energizing coil MS2 in circuit 200A. Energizing coil MS2 closes all relays MS2, including relay MS2 in circuit 200A, which is then locked closed after GS2S in circuit 203A is opened.

Among relays MS1 that have been closed in the above fashion is relay MS1 in circuit 206. Closing relay MS1 in circuit 206 energizes coil C1S which closes relay C1S in circuit 208.

Also, relay MS1 in circuit 215 closes, signalling control 100 to slow from feed speed to slow feed speed. After the transporter 7 has slowed and moved forward at that slow feed speed into abutment with the bulkhead at the forward end of deck 10, mechanical torsion sensing device 117 closes relay 208 in circuit 207. This completes the circuit energizing coil TS1. Energizing coil TS1 in circuit 207 opens relay TS1 in circuit 209, interrupting the electrical circuit 209 and deenergizing coil S. Deenergizing coil S opens $S_2$ and interrupts the section of the stow bus circuit connected to the barge position geared limit switches. The cycle of loading the first barge on the port side of deck 10 is complete, the memory 116 has recorded its location, and the next cycle for loading the second barge will be ready to be commenced by depressing switch 102 again as soon as platform 155 returns to its level position, causing device 117 to close TS1 in circuit 209.

Depressing switch 102 once again energizes coil S and closes relays $S_1$ and $S_2$. The geared limit switches 115 for barge positions aft of barge position two are again inoperative since each has an open relay in its circuit. However, since coil MS1 in circuit 200 has remained energized, relay MS1 in circuit 203A remains closed, and geared limit switch GS2S will energize coil RS2 in circuit 203A when it closes. Energizing coil RS2 closes relay RS2 in circuit 200A, energizing coil MS2 in that circuit. Energizing coil MS2 closes all the MS2 relays in circuits 200A, 203B, 204A, 205A, 206A, 206B, setting up the memory 116 for barge position three. Also, MS2 in circuit 215 is closed, signalling control 100 to slow winch drive 110 to the slow feed speed. Coil C2S in circuit 206A is energized, closing relay C2S in circuit 207A in setting up the impending tension stop. Towing the second barge into the aft end of the barge stowed in position one tilts platform 155 actuating device 117 which closes relay 208A, energizes coil TS2 in circiut 207A, opens relay TS2 interrupting circuit 209, and stops transporter 7.

In this same manner, subsequent cycles can be used to stow barges in positions three, four, five and six. For further illustration, however, it is assumed that no more than two barges have been stowed on the port side of deck 10.

In the unloading operation, the retrieve switch 103 is depressed to actuate the retrieve cycle. Depressing switch 103 energizes coil R in circuit 210. Energizing coil R closes relays $R_1$ and $R_2$, locking circuit 210 and energizing the retrieve bus 211.

Geared limit switches 115 for all barge stowage positions aft of position two will remain inoperative since a memory relay for each of these positions remains open. However, geared limit switch GS2R in circuit 204A will energize coil RR2 since relays MS2 all have remained closed. Energizing coil RR2 closes relay RR2 in circuit 201A energizing coil MR2 which closes relay MR2 and locks circuit 201A closed. Closing MR2 in circuit 215 signals winch drive 110 to slow down as described earlier.

Energizing coil RR2 also closes relay RR2 in circuit 205A, energizing coil C2R and opening relay C2R in circuit 200A. Opening relay C2R in circuit 200A interrupts that circuit and deenergizes coil MS2 cancelling all memory of a barge in position two.

Geared limit switch relay GSA in circuit 210 is opened when transporter 7 nears elevator 2, interrupting circuit 210 and stopping the transporter just forward of elevator 2.

To retrieve the barge stowed in barge stowage position one, the operator depresses switch 103. Depressing switch 103 energizes coil R closing relays $R_1$ and $R_2$. All barge position geared limit switches aft of position number one are inoperative, leaving geared limit switch GS1R the first to close its circuit as the transporter 7 is towed forward. Since coil MS1 in circuit 200 has remained energized keeping all MS1 relays closed, closing switch GS1R energizes coil RR1 in circuit 204.

Energizing coil RR1 closes relay RR1 in circuit 201, energizing coil MR1 and locking relay MR1 in circuit 201 closed while closing relay MR1 in circuit 215 causing transporter 7 to slow down as previously described. Energizing coil RR1 also closes relay RR1 in circuit 205, energizing coil C1R and opening relay C1R in circuit 200 cancelling all memory of a barge stowed in position one. As interrupting circuit 200 deenergizes coil MS1, it also opens relay MS1 in circuit 201, canceling all retrieving memory remaining as well.

As before, the aft geared limit switch interrupts circuit 210 as transporter 7 nears elevator 2 and is stopped in its unload position just forward of elevator 2.

Relays $R_3$ and $S_3$ are provided in circuits 209 and 210, respectively, to insure that the inadvertent depressing of switch 102 during a retrieve cycle or 103 during a stow cycle would be inoperative.

Figure 16:
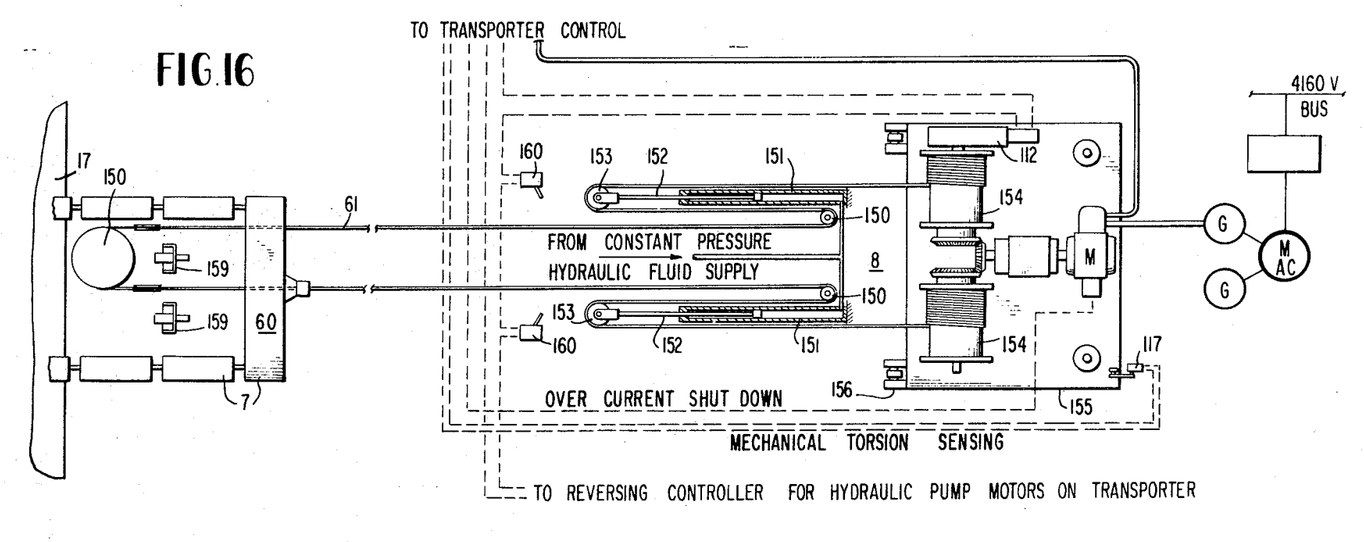
FIGURE 16 represents the drive system for the transporter.
Figure 17:
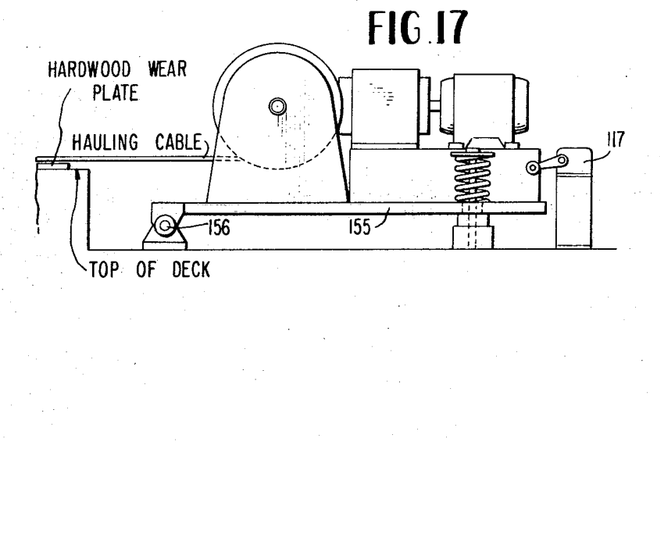
FIGURE 17 represents a side view of the winch drive platform as shown in overhead view in FIGURE 16.
Figure 18:
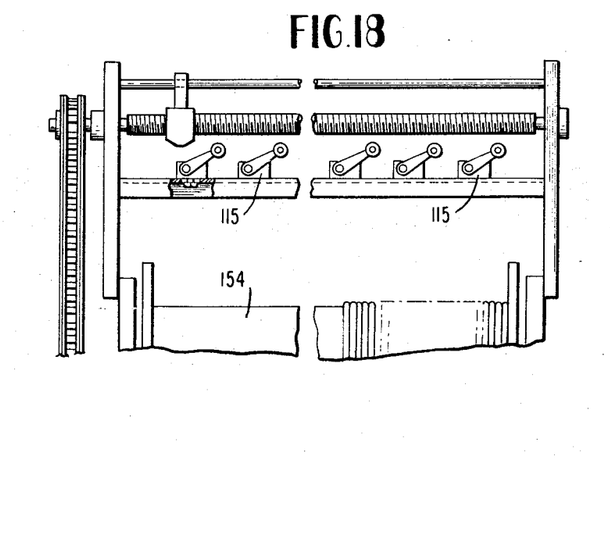
FIGURE 18 represents a view of a series of geared limit switches showing how they are actuated by the winch drive.

A type of reliable mechanical torsion sensing device is shown in detail in FIGURE 16 and 17. Cable 61 is supported by sheaves 150 at both the forward and aft ends of deck 10. Keeping cable 61 taut between sheaves 150 are hydraulic cylinders 151 securely fastened to the hull 8 of the vessel. The pistons 152 of cylinders 151 have their heads replaced by sheaves 153 over which cable 61 travels while being wound and unwound on drums 154. Drums 154 are geared to each other so that they rotate in opposite directions while driven by a common drive. As one is winding cable 61 while the other is unwinding it, the cable 61 is maintained at substantially constant tension. The main variation in tension expected to be encountered by cable 61 is the inertia to be overcome in towing transporter 7.

When tension greater than that expected inertial drag is experienced by cable 61, such as would be experienced if transporter 7 were towed into shock abutments 159, added compressive force is exerted on pistons 155 of cylinders 151. Sensing of this extraordinary tension in a preset amount pulls platform 155 forward and upward about pivot 156, automatically cutting the power to winch drive 110 and setting brake 112.

Should this mechanical torsion sensing device fail to function, an overload would be placed on the winding drum 154, requiring an overload current, and actuating the overcurrent shut down 118.

Conversely, should cable 61 break and the tension on cable 61 and hence the compressive pressure on pistons 152 diminish past some preselected level, pistons 152 would extend by some preset length out of cylinders 151, actuating the broken cable sensing device 160. Actuation of broken cable sensing device 160 automatically cuts power to winch drive 110, sets brake 112, and lowers pistons 45.

The manual transporter transfer control 120 is designed to take over the loading and unloading of the barges from the elevator 2 to deck 10 in substitution for control 100, if needed. Manual control 120 is supplied port switches 170-177 and corresponding starboard switches.

Depression of maintained contact switch 170 powers winch drive 110 to tow transporter 7 forward at the slow feed speed subject to the remainder of the automatic cycle that would have occurred had the power come from control 100 rather than control 120. Similarly, depression of maintained contact switches 171-173 would power winch drive 110 to tow transporter 7 forward at feed speed, aft at slow feed speed, or aft at feed speed, respectively, subject to the remainder of the automatic cycle that would have occurred had the power come from control 100 rather than control 120.

Depression of momentary contact switch 174 would raise pistons 45 only so long as switch 174 remains depressed. Similarly, depression of momentary contact switch 175 would lower pistons 45 only so long as switch 175 remains depressed.

Depression of momentary contact switch 176 would raise the make-up rails 17 and 18 only so long as switch 176 remains depressed. Similarly, depression of momentary contact switch 177 would lower the make-up rails 17 and 18 only so long as switch 177 remains depressed.

Manual transporter transfer control 120 would be locked to prevent any of these functions by actuation of the mechanical torsion sensing device 117, the overcurrent shut down 118, or the broken cable sensing device 160.

We claim:

1. In a marine carrier of the type comprising a hull, a plurality of storage decks arranged one above the other, each storage deck having at least one loading opening extending through the carrier hull at the level thereof, an elevator fastened to said hull and capable of submerging, receive receiving floating barges thereon, and lifting said barges to each respective storage deck level at the loading opening on said deck, an automatic control system comprising actuator means to start the lifting of said barges, limit switch means to stop the elevator at a preselected storage deck level, and means responsive to said limit switch means to mate the elevator toward that preselected storage deck.

2. In a marine carrier of the type described in Claim 1, the combination thereof with means to bridge the elevator with the preselected storage deck.

3. In a marine carrier of the type comprising a hull, a plurality of storage decks arranged one above the other, each storage deck having at least one loading opening extending through the carrier hull at the level thereof, an elevator fastened to said hull and capable of submerging, receiving floating barges thereon, and lifting said barges to each respective storage deck level at the loading opening on said deck, the method of loading barges thereon that comprises actuating the lifting of the elevator to a preselected storage deck level, stopping the elevator at that preselected storage deck level by limit switch means, and mating said elevator toward said preselected storage deck by means responsive to said limit switch means.

4. In a marine carrier of the type described in Claim 3, the method of loading barges thereon that comprises bridging the elevator with the storage deck by means responsive to said mating means.

5. In a marine carrier of the type comprising a hull, a plurality of storage decks arranged one above the other, each storage deck having at least one loading opening extending through the carrier hull at the level thereof, an elevator fastened to said hull and capable of submerging, receiving floating barges thereon, and lifting said barges to each respective storage deck level at the loading opening on said deck, the method of transporting barges from the elevator onto the storage deck that comprises initiating a control sequence including lifting a barge on the elevator, transporting the lifted barge from the elevator onto the storage deck, and lowering the barge.

6. In a marine carrier of the type comprising a hull, a plurality of storage decks arranged one above the other, each storage deck having at least one loading opening extending through the carrier hull at the level thereof, an elevator fastened to said hull and capable of submerging, receiving floating barges thereon, and lifting said barges to each respective storage deck level at the loading opening on said deck, the combination thereof with means capable of initiating lifting a barge on the elevator, means responsive to said lifting means capable of transporting the lifted barge from the elevator onto the storage deck, and means responsive to said transporting means capable of lowering the barge.

7. In a marine carrier of the type comprising a hull, a plurality of storage decks arranged one above the other each storage deck having at least one loading opening extending through the carrier hull at the level thereof, an elevator fastened to said hull and capable of submerging, receiving floating barges thereon, and lifting said barges to each respective storage deck level at the loading opening on said deck, apparatus on at least one storage deck level for automatically engaging and positioning a barge for stowage comprising actuator means for initiating an automatic sequence of engaging and positioning said barge for stowage, means responsive to said actuator means for engaging said barge and means responsive to said actuator means for positioning said barge for stowage aboard said carrier.

8. In a marine carrier of the type comprising a hull, a plurality of storage decks arranged one above the other each storage deck having at least one loading opening extending through the carrier hull at the level thereof, an elevator fastened to said hull and capable of submerging, receiving floating barges thereon, and lifting said barges to each respective storage deck level at the loading opening on said deck, the improved apparatus on at least one storage deck level for engaging and positioning a barge for stowage comprising actuator means capable of initiating an automatic sequence of engaging, lifting and positioning said barge for stowage, means responsive to said actuator means capable of automatically engaging and lifting said barge and means responsive to said lifting means capable of automatically positioning said barge for stowage aboard said carrier.

9. In a marine carrier of the type comprising a hull, a plurality of storage decks arranged one above the other each storage deck having at least one loading opening extending through the carrier hull at the level thereof, an elevator fastened to said hull and capable of submerging, receiving floating barges thereon, and lifting said barges to each respective storage deck level at the loading opening on said deck, the improved method of engaging and positioning a barge on at least one storage deck level comprising initiating an actuator means for controlling the sequence of engaging and positioning said barge, engaging said barge by means responsive to said actuator means and positioning said barge for stowage aboard said carrier by means responsive to said engaging means.

10. A method described in Claim 9 wherein positioning said barge for stowage comprises initiating lifting said barge by an actuator means and positioning said barge on that storage deck level by means responsive to said lifting means.

11. A method as described in Claim 9 wherein engaging said barge comprises initiating lifting a barge by an actuator means, assuming the weight of said barge by said lifting means.

12. A method as described in Claim 9 wherein positioning said barge comprises initiating lifting said engaged barge to a preselected height by an actuator means, and towing said barge from said elevator onto said storage deck by means responsive to said lifting means.

UNITED STATES PATENT OFFICE
CERTIFICATE OF CORRECTION

Patent No. 3,524,421                            August 18, 1970

Alfred H. Schwendtner et al.

It is certified that error appears in the above identified patent and that said Letters Patent are hereby corrected as shown below:

Column 6, line 55, before "that" insert -- in --. Column 7, line 20, "indentity" should read -- identity --. Column 11, line 32, cancel "receive".

Signed and sealed this 2nd day of March 1971.

(SEAL)

Attest:

Edward M. Fletcher, Jr.

Attesting Officer

WILLIAM E. SCHUYLER, JR.

Commissioner of Patents